(No Model.) 2 Sheets—Sheet 2.
J. H. HALEY.
SEED PLANTER.
No. 596,997. Patented Jan. 11, 1898.
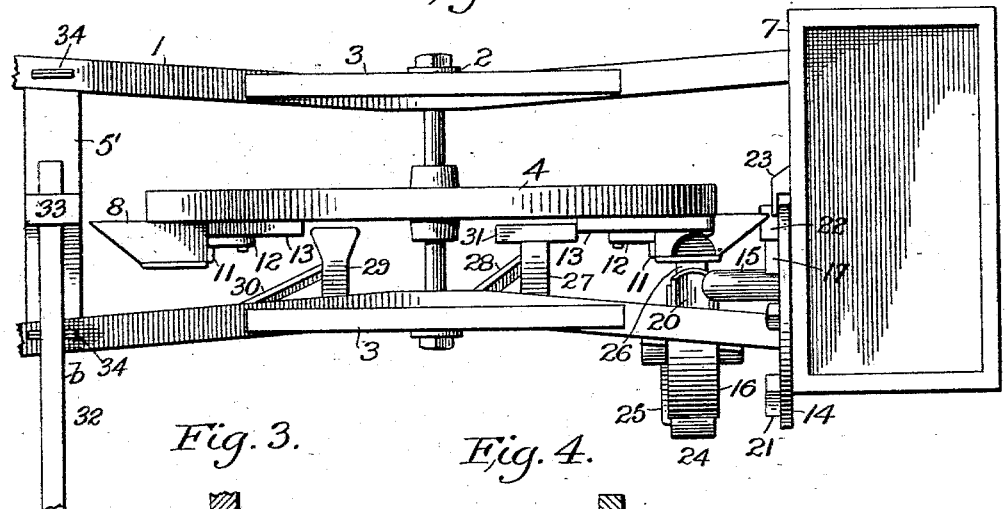
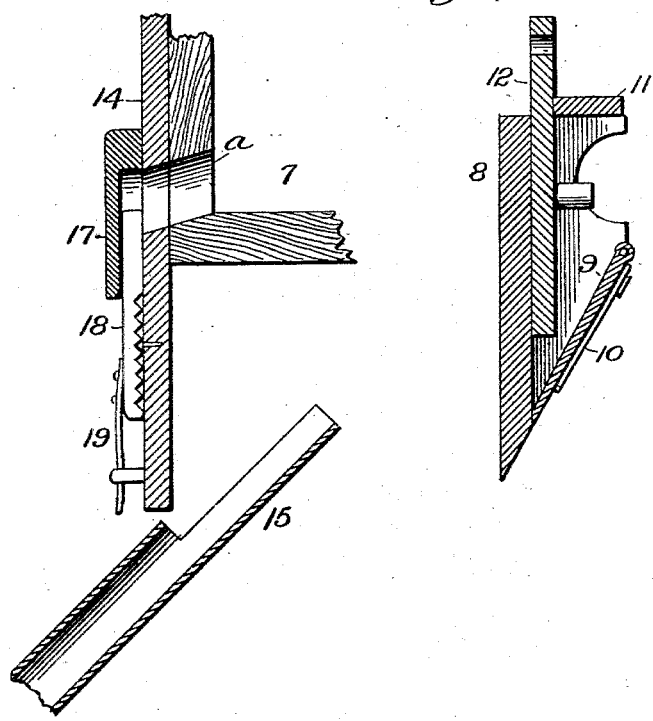
WITNESSES
James F. Duhamel
[signature]
INVENTOR,
JAMES H. HALEY,
By John Wedderburn
Attorney

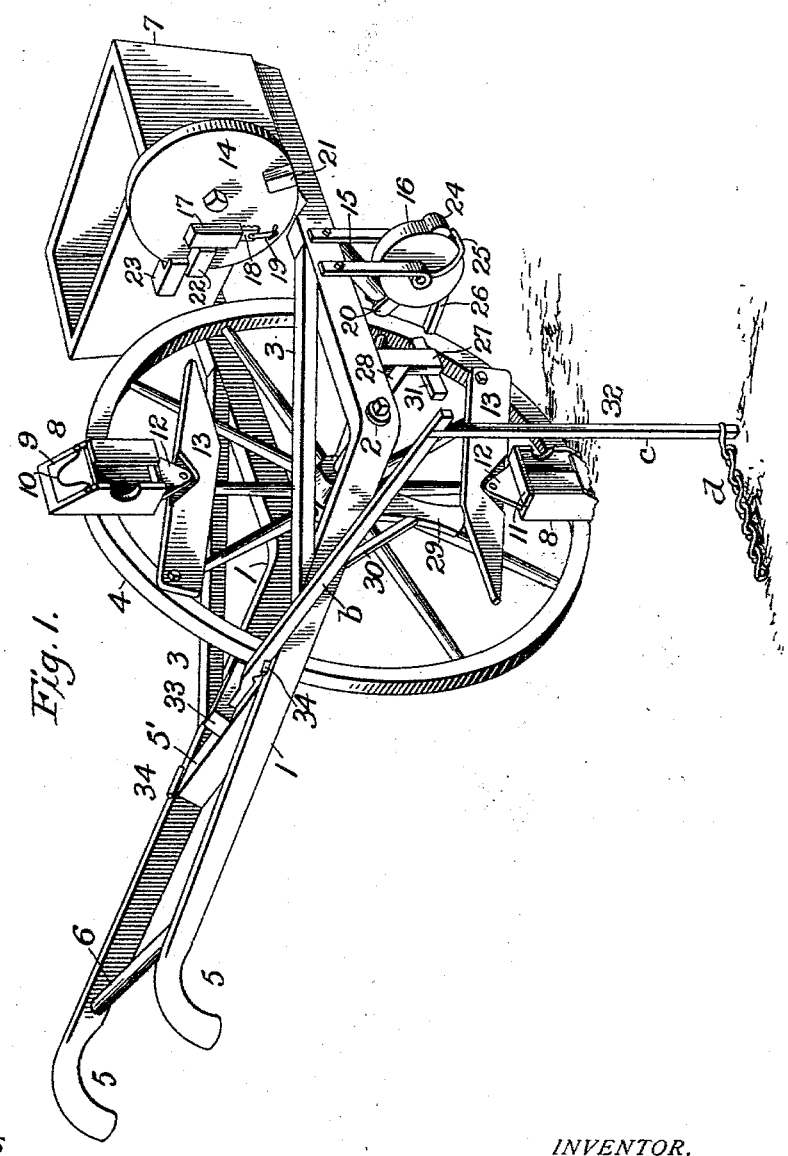

UNITED STATES PATENT OFFICE.

JAMES H. HALEY, OF HENRIETTA, MICHIGAN.

SEED-PLANTER.

SPECIFICATION forming part of Letters Patent No. 596,997, dated January 11, 1898.

Application filed March 5, 1897. Serial No. 625,956. (No model.)

*To all whom it may concern:*

Be it known that I, JAMES H. HALEY, a citizen of the United States, residing at Henrietta, in the county of Jackson and State of Michigan, have invented certain new and useful Improvements in Walking Seed-Planters; and I do hereby declare the following to be a full, clear, and exact description of the invention, such as will enable others skilled in the art to which it appertains to make and use the same.

This invention relates to improvements in agricultural machines of the particular class known as "walking-seed-planters."

The object of the invention is to provide a machine of this character which will be positive and regular in its operation to drop the seed at the proper time to form hills of equal distance apart, the particular construction and arrangement of the several parts presenting a planting-wheel supported in a suitable frame and carrying pockets which receive a supply of seed from a hopper through the intervention of the special feeding mechanism, the said pockets being operated at the proper time to deposit the seed into the ground. With the machine I employ an adjustable marker of particular construction to give a line or mark for guiding the machine after the first row of hills has been planted.

Having the above objects in view, the invention consists in a walking seed-planter comprising a planting-wheel supported in a suitable frame, pockets attached to the wheel and containing a plunger, mechanism carried by the supporting-frame and operating the plunger, together with a hopper and devices for feeding the seed therefrom to the pockets of the planting-wheel.

The invention further consists in the particular construction and combination of parts, as will be hereinafter fully set forth, and specifically pointed out in the claims.

In the accompanying drawings, forming part of this specification, Figure 1 is a perspective view of a walking seed-planter constructed in accordance with my invention. Fig. 2 is a plan view. Fig. 3 is a sectional view through the feed-wheel and adjoining side of the hopper, and Fig. 4 is a sectional view through one of the pockets carried by the planting-wheel.

Referring to the drawings, 1 1 designate the longitudinal side beams of the supporting-frame, which are inclined upward from the bearing 2, which supports the planting-wheel, said beams being braced by the horizontal strips 3. Within the bearings 2, supported by the longitudinal side beams of the supporting-frame, is journaled the planting-wheel 4, said wheel being also the ground-wheel, by which the machine is supported. The side beams, which make up the supporting-frame of the machine, are extended to provide handles 5, being connected to each other in the rear of the planting-wheel by means of a cross-piece 5' and cross-bar 6, the said cross-piece forming a connection for the marker hereinafter described. The forward ends of the longitudinal side beams 1 1 support the seed-hopper 7 of any desired capacity.

Upon the rim of the planting-wheel 4 are secured pockets or receptacles 8, located diametrically opposite each other. These pockets are provided at their lower ends with a hinged plate 9, forming the outer side of the receptacle or pocket, said plates being hinged at their upper ends, so that their lower ends will open outward, being held closed by means of a spring 10, bearing against the free end thereof. The forward part of this pocket is open directly above the hinged plate 9 and at its upper end is provided with a cross-bar 11, forming the guide for a reciprocating plunger 12, the lower end of which is adapted to swing the plate and open the lower end of the pocket. The plunger 12 is pivoted to a lever 13, fulcrumed at one end to the rim of the planting-wheel, its free end being beveled, as shown, while the plunger is connected thereto at an intermediate point. It may be here stated that the number of pockets or receptacles just described depends upon the circumference of the planting-wheel and the distance apart it is desired to plant the hills.

In order to feed the corn or seed from the hopper 7 into the pockets or receptacles 8 at the proper time, I have provided special devices for this purpose consisting of a feed-wheel 14, which takes the corn from the hopper and feeds it into an inclined chute 15, from which it is deposited into a cup carried by a delivery-wheel 16 and from there deposited into the said pockets or receptacles, the feeding mechanism being operated by devices carried thereby and by the planting-wheel. The feed-wheel which takes the corn from the hopper and feeds it into the chute 15 is provided with a transverse opening $a$, which communicates with a pocket formed in a block 17, rigidly secured to said wheel. This pocket is provided with a very simple device for regulating the amount of corn or grain received thereby, consisting of a flat bar 18, having notches in its under side which engage a projection of the wheel to vary the size of the pocket, the said bar being held in its adjustment by means of the spring 19. The inner side of this feed-wheel bears against the adjoining side of the hopper, and the opening therein and pocket are so located that a turning of the wheel will bring said opening below the bottom of the hopper and permit the corn or seed to be deposited into the inclined chute 15, said chute being so supported with respect to the delivery-wheel 16 that it will deposit into the cup 20 when said cup is in its normal position at the lower end of the chute. The feed-wheel 14 is provided with a weight 21, which acts to turn the wheel and locate the opening therein on a line with the opening in the hopper, this movement being limited by stops 22 and 23, carried by the wheel and hopper, respectively. The stop 22 is extended to provide an arm or projection by which the feed-wheel may be operated against the action of the weight, this operation being effected by the pockets or receptacles which are carried by the planting-wheel, it being noted that the said pockets project beyond the rim, and the feed-wheel or operating-arm thereof is properly located with respect to said pockets. The delivery-wheel 16 is also provided with a weight 24, which returns it to its normal position, with the cup 20 thereof at the end of the chute, said weight also serving as a stop to limit the movement of the wheel by contact with the projecting end of its support 25. This delivery-wheel is also provided with a projecting arm 26, by which it is operated through contact with the pockets or receptacles 8.

Depending from the longitudinal side piece on one side of the frame is a bar or leg 27, having an inclined brace 28, this bar or leg being located in front of the axle of the planting-wheel. In the rear of the axle of the planting-wheel is a second leg 29, having an inclined brace 30. These legs are for the purpose of operating the lever 13, connected to the plunger to properly operate the latter in depositing the seed into the ground, and to this end the leg 27 is provided with a foot 31, which extends inward and engages a projection on the lever 13 to operate it in one direction, while the end of the leg 29 engages the bevel end of the said lever to throw it in the other direction.

In connection with the planting-machine constructed as herein shown and described I employ a marker 32, consisting of a long arm or member $b$ and a depending member $c$, which carries a chain $d$ at its lower end. The horizontal member of the marker is provided with two transverse notches, so that when the end is placed in engagement with the loop 33 on the cross-piece 5' of the supporting-frame one or the other of said notches may be placed in engagement with the projection 34 on said cross-piece. This provides for adjusting the marker so that it may extend beyond either side of the machine, for when it is located on the side of the machine corresponding with the side of the planting-wheel having the pockets the horizontal member is placed so that the notch nearest the end will engage the projection 34 on that side of the machine, while when the marker is turned to the other side of the machine the notch farthest from the end is placed in engagement with the corresponding projection. This construction is necessary, owing to the fact that the pockets are located on one side of the planting-wheel.

From the foregoing description, in connection with the accompanying drawings, the construction and operation of my improved seed-planter will be readily understood, for upon the rotation of the planting-wheel 4 one of the pockets or receptacles 8 will first engage the projecting arm 22 of the feed-wheel and turn said feed-wheel sufficient to bring the opening therein below the bottom of the hopper. This will feed a supply of grain into the inclined chute 15, from which it will be deposited into the cup 20 of the delivery-wheel. In the meantime the feed-wheel will be released and return to its normal position by the weight 21, and the pocket will then contact with the arm 26 of the delivery-wheel and turn the cup to empty its contents in said pocket, a further rotation of the planting-wheel bringing the lever 13 in engagement with the foot 31 of the leg 27 to raise the plunger 12 and permit the charge of corn or grain to pass into the lower end of the pocket, after which the lever is thrown in the opposite direction by the leg 29 forcing the plunger downward, which will swing the plate 9 and force the grain or seed beyond the same into the ground, this latter operation taking place when said cup is on a vertical line below the axle. In order to support the plunger in proper connection with the pocket or receptacle carried by the planting-wheel when said pocket or receptacle is above the axle, the plunger has a projecting pin which engages the cross-bar 11. As the machine is pushed across the field the chain $d$ at the lower end of the marker 32 travels over the ground, making a mark which can be followed by the planting-wheel when the next row is being planted.

The construction and arrangement of the parts comprising my improved seed-planter provide an implement or machine which can be operated by one man, and the hopper can be of a capacity to carry grain sufficient to sow a single row. The operation of the several parts is very positive and regular, and consequently a machine of this character is likely to sow the hills more regular than the check-row corn-planter.

Having thus described my invention, what I claim as new, and desire to secure by Letters Patent, is—

1. In a seed-planter, the combination with the supporting-frame carrying a hopper, of a planting-wheel mounted within the supporting-frame carrying cups or pockets at its outer edge, a delivery-wheel supported by the frame and having a cup and operating-arm, a weight attached to the delivery-wheel to return it to its normal position, a chute leading from the hopper and discharging into the cup of the delivery-wheel; together with mechanism operated by the planting-wheel to regulate the discharge of grain into the inclined chute, substantially as shown and for the purpose set forth.

2. In a seed-planter, the combination with the main frame, of a hopper mounted thereon, a planting-wheel journaled in the main frame and carrying pockets at its outer edge, of a vertical feeding-wheel mounted on one side of the hopper over an opening therein and having a pocket which receives the grain therefrom, an arm projecting from the feed-wheel and operated upon by the planting-wheel to empty the pocket, and a chute receiving the seed and delivering it into the pocket or pockets on the planting-wheel, substantially as shown and for the purpose set forth.

3. In a seed-planter, the combination with the main frame, of a hopper mounted thereon, a planting-wheel journaled in the main frame and carrying pockets at its outer edge, a vertical feed-wheel mounted on one side of the hopper and having an opening or pocket which communicates with an opening therethrough, a projection on the feed-wheel engaged by a projection on the planting-wheel to move the feed-wheel and empty the pocket, and means for returning the feed-wheel to its normal position, substantially as shown and for the purpose set forth.

4. In a seed-planter, the combination with the main frame, of a hopper mounted thereon, a planting-wheel journaled in the frame and carrying pockets at its outer edge, of a vertical feed-wheel for feeding the seed from the hopper to the pockets carried by the planting-wheel, said feed-wheel having a pocket which communicates with the hopper, a projection on the feed-wheel engaged by a projection on the planting-wheel, a stop carried by the hopper to engage the projection of the feed-wheel, and a weight attached to said feed-wheel to return it to its normal position, together with a chute leading from a point beneath the feed-wheel, and a cup-wheel receiving the seed and discharging it into the pockets of the planting-wheel, substantially as shown and for the purpose set forth.

In testimony whereof I have signed this specification in the presence of two subscribing witnesses.

JAMES H. HALEY.

Witnesses:
NANNIE KING,
GERTRUDE H. DAUBY.